United States Patent [19]

Camboulives et al.

[11] Patent Number: 4,466,573
[45] Date of Patent: Aug. 21, 1984

[54] WET PIPE DEVICE FOR TURBOJET ENGINES

[75] Inventors: AndréA. M. L. Camboulives, Savigny Sur Orge; Gérard M. F. Mandet, Epinay Sous Senart, both of France

[73] Assignee: Societe Nationale D'Etude et de Construction de Moteurs D'Aviation ("S.N.E.C.M.A."), France

[21] Appl. No.: 508,415

[22] Filed: Jun. 28, 1983

Related U.S. Application Data

[63] Continuation of Ser. No. 226,086, Jan. 19, 1981, abandoned.

[30] Foreign Application Priority Data

Jan. 25, 1980 [FR] France .............................. 80 01814

[51] Int. Cl.³ .............................................. B64C 15/06
[52] U.S. Cl. .............................................. 239/265.41
[58] Field of Search ....................... 239/265.33, 265.37, 239/265.39, 265.41, 265.19; 60/271

[56] References Cited

U.S. PATENT DOCUMENTS

| | | | |
|---|---|---|---|
| 2,972,226 | 2/1961 | Geary | 239/265.39 |
| 3,537,647 | 11/1970 | Camboulives et al. | 239/265.39 |
| 3,612,106 | 10/1971 | Camboulives et al. | 239/265.39 |
| 3,807,637 | 4/1974 | Camboulives et al. | 239/265.41 |
| 3,837,580 | 9/1974 | Camboulives et al. | 239/265.39 |
| 3,892,358 | 7/1975 | Gisslen | 239/265.39 |
| 4,073,441 | 2/1978 | Nash et al. | 239/265.41 |
| 4,245,787 | 1/1981 | Freid | 239/265.41 |

Primary Examiner—John J. Love
Assistant Examiner—Michael J. Forman
Attorney, Agent, or Firm—Bacon & Thomas

[57] ABSTRACT

Jet pipe device for turbojet engines, having at least one annular assembly of flaps with variable inclinations with respect to the axis of the assembly. The device has an assembly of control elements, each of which is associated with a flap to control the inclination of this flap; a synchronizing device interconnecting all of the racking lever; and an annular support element carrying both the flaps and the control devices.

9 Claims, 3 Drawing Figures

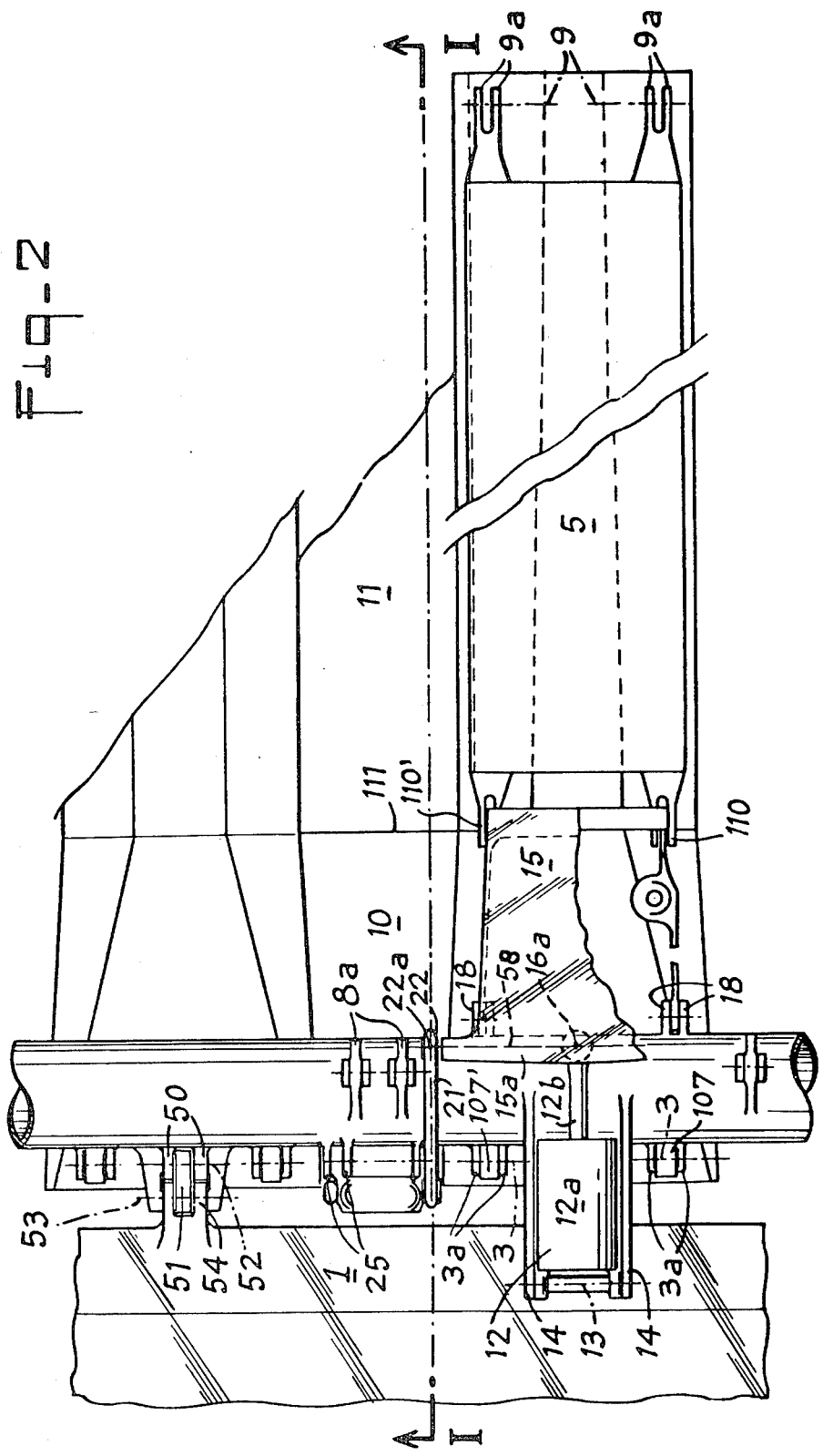

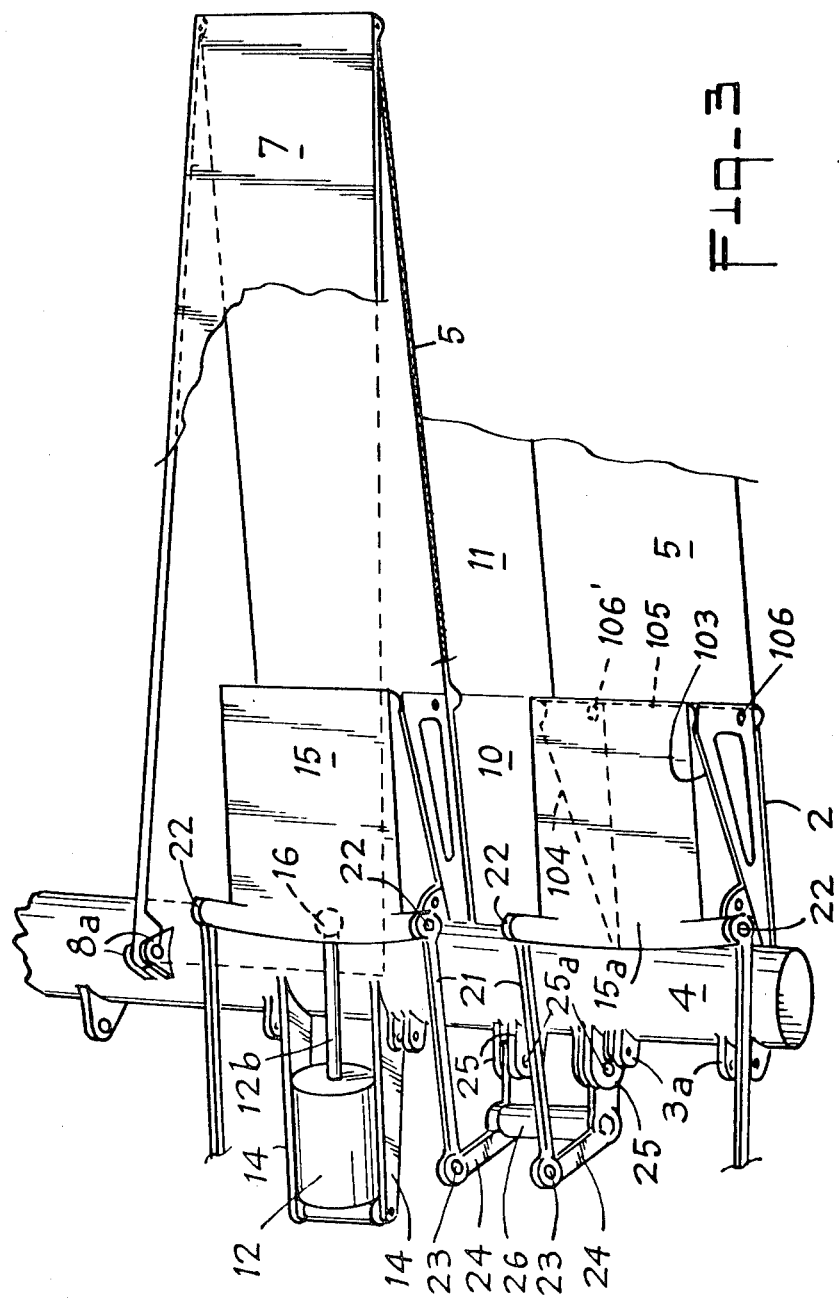

WET PIPE DEVICE FOR TURBOJET ENGINES

This application is a continuation of application Ser. No. 226,086, filed Jan. 19, 1981 now abandoned.

BACKGROUND OF THE INVENTION

The present invention concerns a jet pipe device for turbojet engines, of the type comprising at least one annular assembly of flaps with variable inclination with respect to the axis of said assembly, a structural element of annular configuration connected hingedly with each of the said flaps, an assembly of control devices with each of the devices associated with a flap to control the inclination of said flap with respect to the axis of the assembly, and a so-called synchronizing device joining together all of the control devices so that the control devices form an annular, radially deformable mechanical assembly having a single degree of freedom.

U.S. Pat. No. 3,612,106 to Camboulives et al shows a jet pipe device of this type wherein the annular structural element is joined with each flap for the suspension of the latter on said structural element by means of two independent suspension linkages, each comprising a lever that is part of a respective control device of the flap. This known device thus requires the use of two control devices for each flap together with two suspension linkages. Furthermore, each of these control devices comprises a jack, the housing whereof is hinged onto a secondary fairing. The connection between the jet pipe and a canal of the turbojet engine with which it is associated, is assured by means of pairs of hinged arms, each forming a ball and socket joint with its center point hinged to the secondary fairing and with its end points hinged on the one hand to the annular structural element, and on the other hand, to the downstream end of the canal of the turbojet engine.

SUMMARY OF THE INVENTION

The present invention is intended to simplify the design of such a jet pipe device.

This object is attained by a design wherein the strucutral element that constitutes a supporting element carries both the flaps and the control devices, by means of which both the construction of the jet pipe and its mounting on the apparatus for which it is intended are simplified, with the entirety of the forces having a radial resultant being supported by said support element.

Advantageously, each flap is hinged at one of its ends, designated the first end, around an axle on the support element.

Advantageously, each control element comprises a force transmission element mounted rotatingly around an axle on the support element and associated for its rotational motion with a motive element, said force transmission element having a part spaced from said axis of rotation and capable of acting on a part of the corresponding flap.

Advantageously, the force transmission elements are connected with each other so as to constitute a kinematic synchronizing chain.

Advantageously, said action and receiving parts are bearing surfaces.

Advantageously, said bearing surfaces are designed so that they are able to roll without sliding on each other during the rotating displacement of the vanes and the force transmission elements.

Advantageously, the receiving part of the flap is located at the level of the other end, designated the second end, opposite said first end of said flap.

Advantageously, the action part of a force transmission element is arranged so that its trajectory, during the pivoting of the transmission element, is essentially perpendicular to the plane of the corresponding flap.

Advantageously, the said first end is the upstream end of the flaps, relative to the direction of displacement of a gas in the jet pipe.

Advantageously, said jet pipe is connected with said canal by means of tierods extending essentially parallel to the axis of said canal.

Such a jet pipe device is applicable specifically to jet pipes of turbojet engines that are simply convergent.

The invention is equally applicable to the control systems of vanes of convergent-divergent jet pipe with a continuous passage and with cold flaps of the cylindrical synchronization type.

In contrast to the device described in French Pat. No. 2,030,532, cited hereinabove, the flaps are not actuated directly by jacks but by means of control levers arranged in staggered relation with respect to a synchronizing device, the latter having connecting tierods oriented parallel to the generatrices of a cylinder having a common axis with the jet pipe (thus the designation of cylindrical synchronization), together with two levers joined by a torsion bar.

One of the characteristics of the invention is that all of the moving elements of the jet pipe are attached to a ring wherein all of the system stresses are "circulating" (these stresses being "looped"), thus relieving the structure of the canal of the turbojet engine to which the jet pipe is attached; the jet pipe introduces into the canal only the axial stresses resulting from the drags acting on the flaps.

Another characteristic is that one of the articulated points of the system consists of a cam capable of rolling without sliding.

A third characteristic consists of the fact that all of the "counter" motions are effected at "maximum lever arm". It is certainly not possible to have, in relation to moving elements, hinges that are rigorously and permanently orthogonal, but it is advantageous, in order to reduce stresses and wear, to keep the angles between the direction of the moving force and that of the axis of the lever or the flap upon which such forces act, from deviating excessively from 90°.

It should be understood that the space and weight advantages mentioned hereinabove exist for simple convergent jet pipes. The evidence indicates that they are even more important when a jet pipe of the continuous passage, convergent-divergent type is involved, particularly if such a pipe contains an assembly of flaps designated "cold flaps", which serve to establish the external aerodynamic continuity of the jet pipe with the fuselage or the nacelle and if the position of the divergent and cold flaps is controlled by that of the convergent flaps. In fact, it is possible in this case to hingedly attach the cold flaps to the same ring, with the result that the forces acting on the divergent flaps and on the cold flaps are equally "looped" into the ring, with the single exception of the tensile (or compressive) forces on the flaps.

BRIEF DESCRIPTION OF THE DRAWINGS

The advantages and characteristics of the invention will be better understood from the description hereinbelow of an embodiment of a convergent-divergent, continuous passage jet pipe with cold flaps, from which the case of a jet pipe that is merely convergent is readily derived. The description is presented with reference to the drawings attached hereto, wherein:

FIG. 2 is a top view of FIG. 1; and

FIG. 3 is a partial schematic perspective view of those elements shown in FIGS. 1 and 2.

DESCRIPTION OF THE PREFERRED EMBODIMENTS

Figure 1:
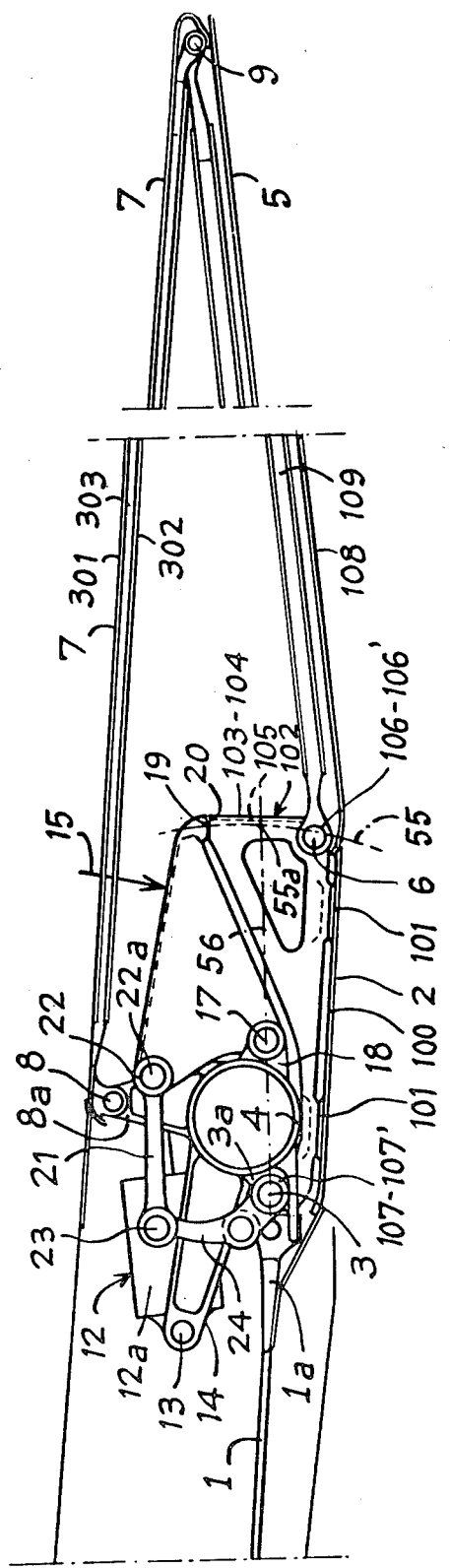
FIG. 1 is a partial view in elevation and in vertical section on I—I of FIG. 2, of a jet pipe device according to an embodiment of the invention.

The jet pipe device shown in FIGS. 1 to 3 is placed at the downstream end of a stationary canal 1 and it comprises:

a first annular assembly of flaps, designated the convergent flaps, 2, each of which is hingedly attached, its upstream end, on an axle 3, by means of clevises 3a secured to a support ring 4 of torical configuration and coaxial with said canal 1;

a second annular assembly of flaps designated the divergent flaps, each of which is hingedly attached by its upstream end, around an axle 6 on the downstream end of a corresponding flap 2;

and a third annular assembly of flaps, designated the cold flaps 7, each of which is hingedly attached, on the one hand at its upstream end, to an axle 8 by means of clevises or shaft holder arms 8a secured to the support ring 4 and at its downstream end, on an axle 9, by means of clevises 9a, secured to the downstream end of a corresponding divergent vane 5.

Between adjacent convergent flaps 2 and also between adjacent divergent flaps 5, there is, in a known manner, follower flaps 10 and 11 respectively, which assure the tightness of the joint between said flaps (FIG. 2).

The flaps 2 and the flaps 5 constitute, respectively, the convergent and the divergent section of a convergent-divergent jet pipe that is coaxial with and follows in line with the canal 1.

The control of the conicity of the convergent and divergent sections of said jet pipe is insured by a device comprising an assembly of jack 12, each of which is associated with a convergent flap 2; each jack 12 is hingedly attached, on the one hand, by its casing 12a, to an axle 13, to the end of a clevis 14 secured to the support ring 4, and, on the other hand, by the free end of its rod 12b to a rocking lever 15, by means of a swivel joint 16, each rocking lever 15 being hingedly attached to the support ring 4 on an axle 17 and clevises 18 secured to said support ring 4. The axle 17 is spaced from the swivel joint 16. The rocking levers 15 are of a prismatic configuration with a triangular section; the axis of rotation 17 occupies one of the apexes of said triangular section. Each rocking lever 15 is capable of acting on a corresponding convergent flap 2, by means of the contact of the bearing surface 19 of said rocking lever on the rocking lever surface 20 of said flap 2; the surfaces 19 and 20 extend along the downstream rims, respectively, of the rocking lever 15 and the flap 2 (FIG. 1).

It should be recalled that "synchronization" consists of insuring the suitable disposition of each flap with respect to all of the others. This synchronization of all of the elements 2, 5, 7, 15 is assured by means of a circular kinematic chain connection between all of the rocking lever 15. This kinematic connection comprises a pair of tierods, designated synchronizing tierods 21, associated with each rocking lever 15, each of said tierods being hingedly attached on the one hand to a rocking lever 15 by means of a swivel joint 22 and, on the other hand, by a swivel joint 23 to the end of a reversing lever 24, the other end of which is hingedly attached to the support ring 4 around an axis 25a, by means of a clevis 25 secured to the ring 4. Advantageously, the tierods 21 are parallel to the axis and at the same radius with respect to said ring.

The hinge axes 3, 6, 8, 9, 13 and 17 associated with the assembly (the rocking lever 15, the corresponding convergent flaps 2, the divergent flap 5 hingedly attached to said flap 2 and the cold flap 7 hingedly attached to said flap 5), are parallel to a fixed direction transverse to the axis of the jet pipe. Each swivel joint 22 is located at a respective end of the upper, upstream rim 15a of the rocking lever 15; preferably, the centers 22a of the hinges 22 associated with one rocking lever 15 and the center 16a of the swivel joint 16 of the rocking lever 15 are aligned on the same straight line 58 parallel to said fixed direction; and point 16a is preferably located in the center of the straight segment defined by the centers 22a of the hinges 22 of the tierods 21 of the same pair. The two reversing levers 24 associated with the tierods 21 of the same pair are connected with each other by means of a torsion tube 26.

According to the example shown, each convergent flap 2 consists of an inner skin 100 to which there is screwed or welded at 101 a prismatic structure 102 of a triangular cross section and comprising two ribs at right angles 103, 104, connected at their base by a cross wall 105; the right angle of the ribs has orifices 106, 106' for the passage of the hinge axles 6 of the divergent flaps 5.

The upstream ends of the ribs 103, 104 have two ears 107, 107' which are hingedly attached to the corresponding clevis 3a of the support ring 4.

The third tip of the ribs 103, 104 comprises the bearing surface 20 upon which the bearing surface of the cam 19 of the racking levers 15 rests.

Each divergent flap 5 consists of a skin 108 and a honeycomb structure 109 which carries the clevises 110, 110' corresponding to the orifices 106, 106' of the corresponding convergent flap 2. Passages may be provided between the hinges to permit the passage of cooling air.

The downstream end of each convergent follower flap 10 is hingedly attached at 111 to the upstream end of the corresponding divergent follower flap 11.

The lateral edges of the follower flaps 10, 11 are embedded in a groove (not shown) in the lateral edges of the adjacent controlled flaps 2 and 5.

The cold flaps 7 insure the aerodynamic joining of the jet pipe and the aircraft.

They consist of an external skin 301, an inner skin 302, the elements 301 and 302 being connected with each other by a honeycomb structure 303. The upstream end of the flaps 7 are articulated at 8 to the claws 8a of the ring 4 and their downstream end at 9 to the downstream end of the divergent flaps 5.

The cylinders 12 are hydraulic cylinders for reasons of space, but they could equally be pneumatic or screw jacks, etc. They are hingedly attached by means of the axle 13 to the two lugs 14 of the ring 4.

The rod 12b is articulated at 16a to the rocking levers 15.

The ring 4 is attached to the canal proper by means of the tierods 51, which are essentially parallel to the axis, articulated on the one hand around an axle 52 to the clevises 50 of the ring 4, and on the other to an axis 53 on the clevises 54 of the canal 1.

The support ring 4 of torical configuration, constitutes a structure to which by means of lugs all of the mobile elements of the jet pipe are hingedly attached, namely:

3a: the hinges of the convergent flaps 2
25: synchronizing reversing levers 24
8a: the hinges of the cold flaps 7
14: hinges of the jacks 12
50: hinges of the canal-jet pipe connecting tierods 51
18: hinges of the rocking levers 15.

Advantageously, the bearing surfaces 19 and 20 are designed so that the bearing surface 19 rolls without sliding during movements of the flaps 2, on the bearing surface 20 of the structure of the convergent flaps 2.

The jet pipe device described hereinabove specifically affords the following advantages:

(a) the jacks 12 act on the convergent flaps 2 at right angles to the throat of the convergent-divergent jet pipe by means of the rocking lever 19 of the bearings 15, the force of which is directed perpendicularly to the plane of the vane 2, resulting in maximum effectiveness and minimum space requirements of the jacks.

(b) the relative displacement between the control system 12, 15 and the vane 2 controlled is extremely small, leading to an extremely reduced friction between the bearing surfaces 19, 20. It is even possible, by means of a particular configuration of the bearing surfaces 19, 20 to reduce this friction to practically zero.

(c) all of the mobile pieces of the jet pipe are attached to the ring 4. This ring is itself attached to the canal 1. This disposition results in the fact that the canal 1 is exposed only to the axial stresses induced by the drag on the flaps 2, 5, 7. The raidal stresses pass in the ring 4 into internal stresses. Furthermore, the difference in expansion between the canal proper and the structure of the jet pipe does not induce thermal stresses, but is absorbed by a slight inclination of the tierods (which may also be thermally compensated). This arrangement makes it possible to avoid the reinforcement, by means of a casing, the zone of the canal 1 to which the jet pipe is attached. In certain cases, it is however, advantageous to provide a slight thickening 1a of the canal 1 in this region.

(d) the pressure of the gases permanently pressures the bearing surface 20 of the convergent flaps 2 against the bearing surface 19 of the rocking lever 15 and this force is transmitted to the jacks 12.

(e) advantageously, the center point 55a of the circular arc 55 upon which the point of application of the force of the rocking lever 15 to the controlled flap 2 is moving, is located on the extension of a straight line 56 connecting the point of articulation 3 of the flap 2 on the ring 4 with the point of articulation 17 of the rocking lever 15; this results in a balanced distribution of the forces. Furthermore, by virtue of this arrangement, relative axial motion between the rocking levers 15 and the controlled flap 2 is the smallest possible, with the forces to be supported always being perpendicular to the plane of the flap 2.

(f) during the rolling of the aircraft with the engine shut down, the flaps 2, 5 and 7 do not tend to beat and "rattle" in the jet pipe. The synchronization elements 15 and 21 to 26 restrict the assembly of the flaps 2, 5 and 7 within the limits of the play at the axles.

The jet pipe described hereinabove operates in the following manner. The jacks 12 act upon the rocking levers 15, which, by means of the bearing surfaces 19 and 20, control the convergent flaps 2 at right angles to the neck of the jet pipe. The convergent flaps 2 entrain the divergent flaps 5 which in turn control the cold flaps 7.

The entire system is auto-synchronized by the tierods 21, the reversing levers of synchronization 24, 26 the cold flaps 7.

The force resulting from the pressure of the gases on the flaps 2, 5, 10 and 11 is directed at an incident angle of 90° on the bearing surfaces 19 of the control rocking levers 15. This force is then distributed uniformly over the circumference of the jet pipe by the latter and the synchronization elements 21 to 26.

It should be noted that the force transmission elements, namely, the rods of the jacks 12b, the tierods 21 and the bearing surfaces 19 and 20, apply or transmit the forces always with an orientation, with respect to the corresponding lever arms, of an angle in the vicinity of 90°.

We claim:

1. A jet pipe device for a turbojet engine having an annular stationary canal structure defining a passage for gaseous fluids wherein the device comprises:

(a) an annular support ring attached to the stationary canal structure so as to prevent relative movement therebetween in a direction parallel to a longitudinal axis of the turbojet engine, the annular support ring attached so as to be coaxial with the stationary canal structure;

(b) a plurality of convergent flaps pivotally attached to the annular support ring such that they define an annular convergent flap assembly, each of the convergent flaps having a free end which is movable in a generally radial direction toward and away from the longitduinal axis of the turbojet engine to constrict or expand the passage for the gaseous fluids;

(c) a plurality of control means connected between the convergent flaps and the annular support ring to selectively cause each convergent flap to pivot abouts its attachment to the annular support ring and move its free end toward or away from the longitudinal axis of the turbojet engine wherein each control means comprises:

(i) a force generating element having a first stationary part attached to the annular support ring and a second part extendable and retractable with respect to the first part, the second part having a distal end;

(ii) a rocking lever pivotally attached to the annular support ring and having a first bearing surface;

(iii) connecting means connecting the distal end of the second part to the rocking lever; and, (iv) a second bearing surface on the convergent flap which contacts the first bearing surface on the rocking lever such that, as the second part extends and retracts with respect to the first part, the rocking lever pivots, thereby causing the convergent flap to pivot about its attachment to the annular support ring; and, (d) synchronizing means interconnecting each control means such that all of the convergent flaps move at the same time in the same direction.

2. The jet pipe device of claim 1 wherein the annular support ring is toroidal in shape with a circular cross-section.

3. The jet pipe device of claim 1 wherein the force generating element is an hydraulic jack having its cylinder attached to the annular support ring and its piston rod attached to the rocking lever.

4. The jet pipe device of claim 1 wherein the force generating element is a pneumatic jack having its cylinder attached to the annular support ring and its piston rod attached to the rocking lever.

5. The jet pipe device of claim 1 wherein the synchronizing means comprises:
   (a) a plurality of pairs of reversing levers each having a first end pivotally attached to the annular support ring and a second end;
   (b) means interconnecting the pair of reversing levers such that they move about their pivot axis together;
   (c) a first tie rod connecting the second end of one of the pair of reversing levers to a first rocking lever; and,
   (d) a second tie rod connecting the second end of the other of the pair of reversing levers to a second rocking lever adjacent the first rocking lever.

6. The jet pipe device of claim 5 wherein the longitudinal axes of the tie rods are parallel to the axis of the stationary canal structure.

7. The jet pipe device of claim 1 wherein the first bearing surface rolls on the second bearing surface without sliding during the movement of the rocking levers and convergent flaps.

8. The jet pipe device of claim 1 wherein the plurality of convergent flaps are attached to the annular support ring at their upstream edge and the second bearing surface is located near the downstream edge of the convergent flaps, the directions being relative to the direction of flow of the gaseous fluids.

9. The jet pipe device of claim 8 further comprising:
   (a) a plurality of divergent flaps having a proximal edge pivotally attached to the downstream edge of one of the convergent flaps and a distal edge;
   (b) a plurality of cold flaps located radially outwardly of the convergent and divergent flaps with respect to the longitudinal axis of the stationary canal structure, each of the cold flaps having an upstream edge and a downstream edge;
   (c) means pivotally connecting the downstream edge of a cold flap to the distal edge of a divergent flap; and
   (d) means pivotally connecting the upstream edge of the cold flap to the annular support ring.

* * * * *

UNITED STATES PATENT AND TRADEMARK OFFICE
CERTIFICATE OF CORRECTION

PATENT NO. : 4,466,573

DATED : August 21, 1984

INVENTOR(S) : CAMBOULIVES ET AL.

It is certified that error appears in the above-identified patent and that said Letters Patent is hereby corrected as shown below:

```
Title page, in the title, change "WET" to --JET--.
Column 1, line 1, in the title, change "WET" to --JET--.
Column 1, line 67, change "vanes" to --flaps--.
Column 3, line 33, change "vane" to --flap--.
Column 4, line 63, 1st and 2nd useage, change "cylinders"
   to --jacks--.
Column 5, line 24, after "lever" insert --surface--.
Column 5, line 39, change "raidal" to --radial--.

In the ABSTRACT, line 6, change "racking" to --rocking--.
```

Signed and Sealed this

Twelfth Day of March 1985

[SEAL]

Attest:

DONALD J. QUIGG

Attesting Officer

Acting Commissioner of Patents and Trademarks